(No Model.)
F. J. FERRELL.
VALVE.
No. 490,227. Patented Jan. 17, 1893.
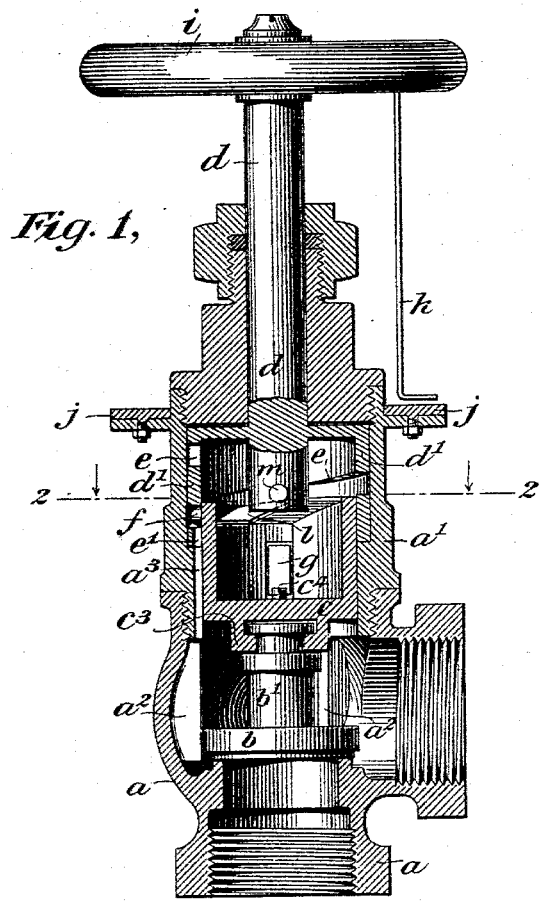
Fig. 1,
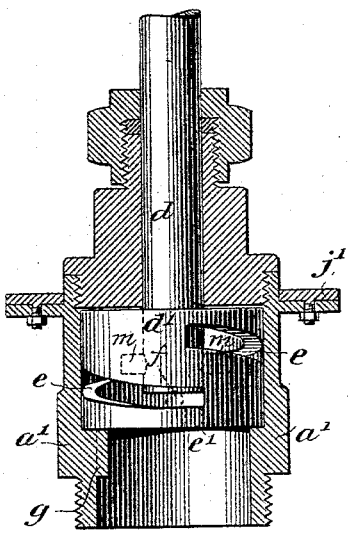
Fig. 3,
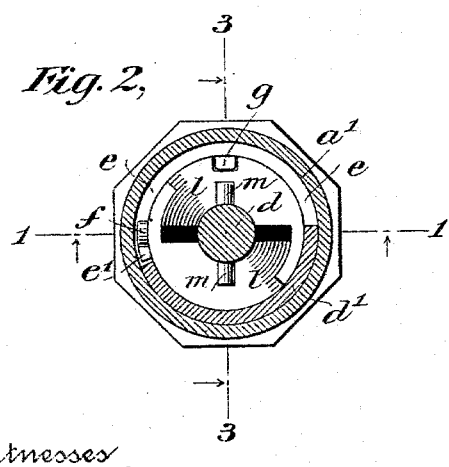
Fig. 2,
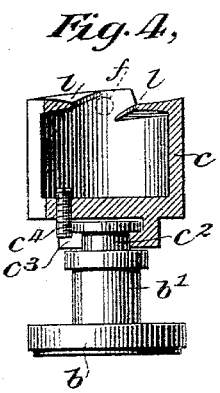
Fig. 4,
Witnesses
C. E. Ashley
S. F. Macpeak.
Inventor
Frank J. Ferrell
By his Attorney
Henry D. Williams

UNITED STATES PATENT OFFICE.

FRANK J. FERRELL, OF NEW YORK, N. Y., ASSIGNOR TO THE FERRELL MANUFACTURING COMPANY, OF NEW JERSEY.

VALVE.

SPECIFICATION forming part of Letters Patent No. 490,227, dated January 17, 1893.

Application filed December 7, 1891. Serial No. 414,208. (No model.)

*To all whom it may concern:*

Be it known that I, FRANK J. FERRELL, a citizen of the United States, residing at New York, county and State of New York, have invented certain new and useful Improvements in Valves, of which the following is a specification, reference being had to the accompanying drawings, forming part hereof.

The invention relates to valves for regulating and controlling fluids, and has for its object to improve the construction of such valves.

The invention comprises various improvements which are hereinafter particularly set forth and claimed.

In the accompanying drawings Figure 1 is a vertical section on the line 1—1, Fig. 2, of a valve embodying my invention. Fig. 2 is a horizontal section of the same on the line 2—2, Fig. 1. Fig. 3 is a detached vertical section on the line 3—3, Fig. 2, of the upper part of the casing and the operating stem, and Fig. 4 is a similar view of the valve stem.

The valve casing is of angular pattern and is composed of two parts $a$ and $a'$. The part $a$ of the casing contains the valve seat and wings or ribs $a^2$ for guiding the valve. The part $a'$ supports the operating stem and contains the operating mechanism. The valve $b$ has a short extension $b'$, which is connected at its upper end with the valve stem $c$. A loose connection between the valve and stem is provided, such connection consisting of a circumferential flange $c^2$, at the top of the extension $b'$ and a partly encircling yoke shaped grooved projection $c^3$ at the bottom of the valve stem $c$. A screw $c^4$ in the stem $c$ prevents unintentional separation of these parts. This connection between the two parts of the stem affords the requisite freedom of movement to permit the valve to freely seat itself.

The valve stem $c$ is fitted to slide in the lower portion of the part $a'$ of the casing. It is guided and held from rotation by the pin $g$, projecting from the casing and working in a vertical slot in the valve stem $c$. The valve stem $c$ is also provided with a tooth $f$, which works in a worm groove $e$, formed in an annular or cup-shaped part $d'$ of the operating stem $d$. The worm groove $e$ preferably corresponds to a uniform helix throughout the greater portion of its stroke, and is gradually reduced in pitch at the lower or closing end of the stroke. At this lower end of the stroke the tooth $f$ has considerable clearance in the groove to permit my independent locking or wedging device to control the movement of the valve at this portion of the stroke. This wedging or locking device consists of portions of the valve stem and of the operating stem having inclined faces arranged to engage at or near the closed end of the stroke of the valve.

The valve stem $c$ is provided with inwardly extending wings or webs $l, l$, two being shown in the drawings, and the upper faces of these wings are inclined. The operating stem is provided with outwardly projecting studs $m$. The lower faces of these studs $m$ should be rounded or otherwise shaped so as to correspond to some extent with the upper faces of the wings $l$. As shown, these studs $m$ are cylindrical. The wings $l$ and studs $m$ do not come in contact during the greater part of the stroke of the valve, the studs $m$ moving freely inside of the cylindrical valve stem $c$, but as the valve approaches its closed position these parts engage and act directly upon the valve stem and valve and finally tightly wedge and lock the valve in closed position. The work of moving the valve is at this portion of the stroke transferred from the worm groove $e$ and tooth $f$ to the studs $m$ and wings $l$, from the outer periphery of the cylindrical valve stem $c$ to points near the axis of the valve.

In Figs. 1 and 2 the valve is shown in closed position and tightly wedged and locked in such position by the studs $m$ and wings $l$.

The operating stem $d$ is fitted to rotate only in bearings in the upper part $a'$ of the casing, and may be kept tight by any suitable disk or stuffing box packing. A stuffing box packing is shown. The upper part of this stem is provided with a hand wheel $i$.

The operating mechanism is so constructed that the operating stem and valve stem may be readily separated or assembled. This is provided by means of the groove $a^3$ formed in the lower portion of the part $a'$ of the casing and extending from the bottom of such part to the cup-shaped portion $d'$ of the operating stem and by the short groove $e'$ formed in the cup-shaped portion $d'$ of the operating stem and arranged so that in one position of such portion, as shown in Fig. 1, it will form a continuation of such groove $a^3$ extending to the worm groove $e$. When the parts are in the position shown in Figs. 1 and 3 and the upper portion $a'$ of the casing has been unscrewed from the lower portion, as shown in Fig. 3, the valve stem may be readily removed, as the tooth $f$ will slide out through the grooves $e'$ and $a^3$. The valve stem and operating stem may be as readily put together with the parts in such position by adjusting the valve stem so that the tooth $f$ will enter first the groove $a^3$ and then the groove $e'$ until it projects within the worm groove $e$. Then by rotating the operating stem the tooth $f$ is caused to move upward in the worm groove $e$. The grooves $a^3$ and $e'$ are so placed that when the parts $a$ and $a'$ of the casing are screwed together the tooth $f$ even in the closed position of the valve does not come exactly in line with the short groove $e'$, so that the worm groove $e$ will not fail to lift the valve stem and valve.

An indicating device is preferably provided for giving visual indications of the position of the valve.

My invention is particularly adapted for containing an indicating device as the full stroke of the valve is accomplished with less than one revolution of the operating stem. The indicating device shown consists of the indicating disk $j$, mounted upon the casing, and an index $k$ attached to the hand wheel $i$ of the operating stem $d$.

What I claim and desire to secure by Letters Patent is:—

1. The combination of a valve, its casing and stem and an operating stem, suitable means for imparting a reciprocating motion to the valve and valve stem from the operating stem, and a device for locking the valve in closed position consisting of inclined faces on the valve stem and operating stem arranged to engage at or near the closed end of the stroke of the valve, substantially as set forth.

2. The combination of a valve, its casing and stem and an operating stem, an extension of one stem inclosing or partly inclosing the other stem, a connecting device between the two stems consisting of a worm and counterpart, and a device for locking the valve in closed position consisting of inclined faces on the valve stem and operating stem arranged to engage at or near the closed end of the stroke of the valve, substantially as set forth.

3. The combination of a valve, its casing and stem and an operating stem, an extension of one stem inclosing or partly inclosing the other stem, a connecting device between the two stems consisting of a worm and counterpart and the locking device consisting of the wings $l$ on the valve stem having inclined upper faces and the studs $m$ on the operating stem, such parts of the locking device being arranged to engage at or near the closed end of the stroke of the valve, substantially as set forth.

4. The combination of a valve, its casing having two separable parts $a$ and $a'$, the groove $a^3$ in the part $a'$, the valve stem having the projecting tooth $f$, and the operating stem having the cup-shaped part $d'$ surrounding the valve stem and the worm groove $e$ and the short groove $e'$ in such part $d'$, substantially as set forth.

FRANK J. FERRELL.

Witnesses:
HERBERT H. GIBBS,
HENRY D. WILLIAMS.